United States Patent [19]
Abe et al.

[11] 3,892,732
[45] July 1, 1975

[54] ANTIBIOTIC TUBERACTINOMYCIN-N AND PROCESS FOR PRODUCTION THEREOF

[75] Inventors: Jinnosuke Abe, Shizuoka; Tetsuo Watanabe, Kanagawa; Akiho Nagata, Shizuoka; Takuji Ando, Shizuoka; Teruo Take, Shizuoka; Rokuro Izumi, Shizuoka; Toshiharu Noda, Shizuoka; Kazuo Matsuura, Shizuoka, all of Japan

[73] Assignee: Toyo Jozo Kabushiki Kaisha, Shizuoka, Japan

[22] Filed: June 30, 1971

[21] Appl. No.: 158,488

[30]     Foreign Application Priority Data
June 30, 1970   Japan.............................. 45-56467

[52] U.S. Cl.......... 260/239.3 R; 424/244; 195/28 R
[51] Int. Cl. .................... C07d 57/00; C07c 103/52
[58] Field of Search .............................. 260/239.3 R

[56]            References Cited
     FOREIGN PATENTS OR APPLICATIONS
1,201,724   8/1970   United Kingdom.......... 260/239.3 R

OTHER PUBLICATIONS

Hugenin et al., "Helv. Chim. Acta," Vol. 48, No. 8, pages 1885–1898 (1965).

Wakamiya et al., "Tetrahedron Letters," (1970), (No. 40), pages 3497–3500.

Yoshioka et al., "Tetrahedron Letters," 1971, pages 2043–2046.

*Primary Examiner*—Henry R. Jiles
*Assistant Examiner*—Robert T. Bond
*Attorney, Agent, or Firm*—Young & Thompson

[57]             ABSTRACT

A new antibiotic of basic peptide Tuberactinomycin-N and process for production thereof which comprises the steps of: cultivating *Streptomyces griseoverticillatus var. tuberacticus* No. N 6-130 FERM P-619 in a nutrient culture medium; cultivating the said culture medium aerobically until substantial antibiotic activity is imparted to said medium; isolating the said antibiotic from the culture medium; obtaining the said antibiotic in its essentially crystalline powder having an antituberculosis activity.

1 Claim, 5 Drawing Figures

ANTIBIOTIC TUBERACTINOMYCIN-N AND PROCESS FOR PRODUCTION THEREOF

This invention relates to a new antibiotic and the process for production of the same. More particularly, it is concerned with a novel antibiotic agent, herein designated tuberactinomycin-N, or the therapeutically acceptable salts thereof, a process for its production by fermentation, and processes for its recovery from fermentation broths.

It has heretofore been reported that there are a large number of antibiotics produced by soil microorganisms, especially genus Streptomyces. Some of these antibiotics have been clinically applied as an antituberculosis agent, such as streptomycin, kanamydin, cycloserine, viomycin and the like. However, recently, strains of tuberculous bacilli resistant to these antituberculosis antibiotics have frequently appeared and have caused serious difficulty in tuberculosis therapy.

The inventors of the present invention had investigated a new antituberculosis antibiotic, and found that a strain belonging to a species of *Streptomyces griseoverticillatus var. tuberacticus* produced an antituberculosis antibiotic, designated as tuberactin of tuberactinomycin (refer to J. Antibiotics, 21, 681 (1968), British Pat. No. 1,201,727). Further the inventors have investigated and discovered that a mutant of the said Streptomyces produced a new and novel antibiotic tuberactinomycin-N, having a superior antituberculosis activity as compared with tuberactinomycin, indicating a stronger antituberculosis activity against Streptomycin-, p-aminosalicylic acid- or kanamycin-resistant tubercle bacillus and showing a low-toxicity against experimental animals.

It is a main object of the present invention to provide a clinically useful novel antituberculosis antibiotic herein designated tuberactinomycin-N.

It is another object of the present invention to provide an industrially advantageous process for the production of the said novel antibiotic.

These and other objects, features and advantages of the present invention will become more apparent to any person skilled in the art upon reading the more detailed description set forth hereinbelow, in connection with the accompanying drawings, in which.

Figure 1:
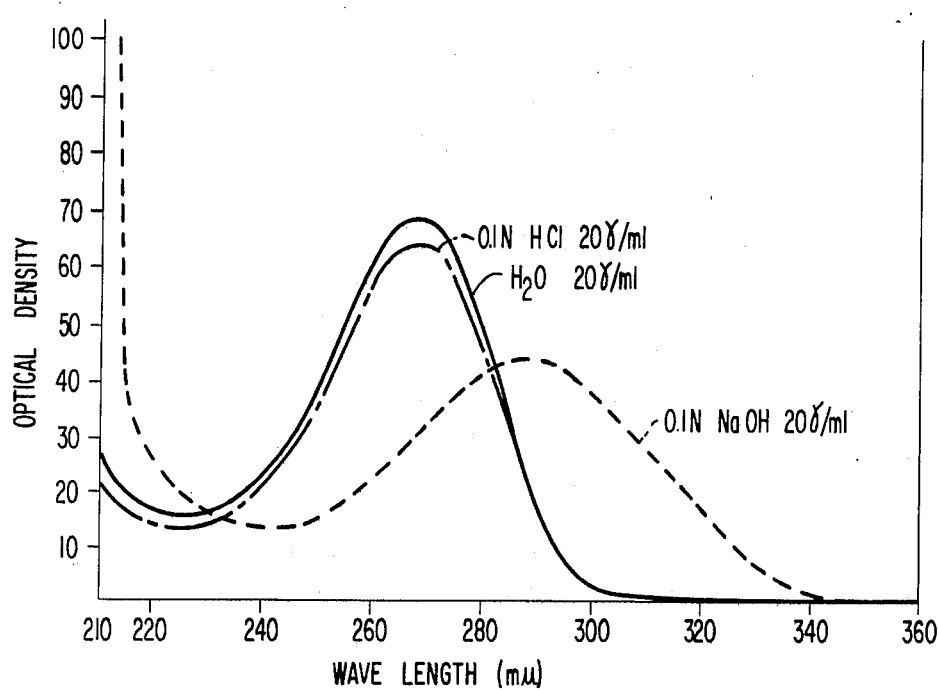
FIG. 1 is a chart showing the ultraviolet absorption spectrum of tuberactinomycin-N hydrochloride.

The tuberactinomycin-N producing strain can be selected from the microorganism belonging to Streptomyces, preferably a mutant strain of *Streptomyces griseoverticillatus var. tuberacticus* NRRL 3482 which was obtained by treatment of nitrosoguanidine.

The following is a general description of taxonomical properties of the said mutant organism based on the diagnostic characteristics observed.

1. The cultural characteristics are sef forth in the Table I.

TABLE I

| MEDIUM | CHARACTERISTIC STUDIED |
|---|---|
| Czapek-Dox. agar | G: Good<br>AM: Good, white to pearl pink (3ca) or light rose beige (4cc).<br>SM: Light wheat (2ea) or bamboo (2gc).<br>SP: None. |
| Asparagine glucose agar | G: Moderate.<br>AM: Moderate, white to shell pink (5ba) or fresh pink (5ca).<br>SM: Sometimes intruding into medium, pearl pink (3ca)-bisque (3ec).<br>SP: None. |
| Bennett's agar | G: Very good.<br>AM: Good, white to fresh pink (4ca) to light rose beige (4ec), droplets.<br>SM: Bamboo (2gc) to gradually darkened to light brown (4ng).<br>SP: None. |
| Bouillon agar | G: Poor.<br>AM: None.<br>SM: Nearly colorless to putty (1½ ec).<br>SP: None. |
| Calcium malate agar | G: Moderate.<br>AM: White to bisque (3ec), short mycelia.<br>SM: Poor growth, pearl - shell tint (3ba).<br>SP: None. |
| Gelatin medium (incubated at 24°C.) | G: Very poor.<br>AM: None.<br>SM: Light brown (4ng) or cocoa brown (5lg), gelatin liquefaction.<br>SP: None. |
| Loffler's serum | G: Moderate.<br>AM: None.<br>SM: Light wheat (2ea) or bamboo (2gc), no haemolysis.<br>SP: None. |
| Starch agar | G: Moderate.<br>AM: Good, white to fresh pink (4ca) - light rose beige (4ec).<br>SM: Sometimes intruding into the medium, fresh pink (4ca) - light rose beige (4ec).<br>SP: None. |
| Potato plug | G: Moderate.<br>AM: Laterly covered with white mycelia.<br>SM: Wrinkled growth, light wheat (2ea).<br>SP: None. |
| Carrot plug | G: None. |
| Egg medium | G: Good.<br>AM: White to pearl (2ba).<br>SM: —<br>SP: None. |
| Milk medium | G: Moderate.<br>AM: Moderate, white to light wheat (2ea) or bisque (3ec).<br>SM: Ring forming at surface, weak coagulation.<br>SP: None. |
| Cellulose | G: None. |
| Tyrosine agar | G: Moderate.<br>AM: Very poor.<br>SM: Light wheat (2ea) - cinnamon (3le).<br>SP: None. |
| Urea-glycerol agar | G: Very good.<br>AM: White to light beige (4ec), covered with many droplets.<br>SM: Light wheat (2ea) - light spice brown (4lg).<br>SP: Almost absent or light putty (1½ ec) or ecru (2ec). |
| Oatmeal agar | G: Good.<br>AM: White to light rose beige (4ec), water droplets.<br>SM: Pearl pink (3ca or 4ca).<br>SP: None. |
| Potato glucose agar | G: Good.<br>AM: Light rose beige (4ec), water droplets.<br>SM: Light amber (3ic) - cinnamon (3le).<br>SP: None. |
| Glucose bouillon | G: Good.<br>AM: None.<br>SM: Nearly colorless mycelia lumps on the bottom.<br>SP: None.<br>G: Good. |

TABLE I-Continued

| MEDIUM | CHARACTERISTIC STUDIED |
|---|---|
| Peptone-glucose agar | AM: Light rose beige (4 ec) to rose beige (4 gc).<br>SM: Butterscotch (3 ne) to golden brown (3 pg).<br>SP: None.<br>G: Moderate |
| Glycerin Czapek | AM: Fresh or pearl pink (4 ca).<br>SM: No color.<br>SP: None. |

Characteristics were observed, except in experiment with gelatin medium, at 30°C., 10 days' cultivation.

The descriptions of colors were taken from "Color Harmony Manual" (Container Corp. of America, 1958) and observed at north daylight.

In Table I, G means Growth, AM means Aerial Mycelium, SM means Substrate Mycelium, and SP means Soluble Pigment.

2. Structure of spore bearing hyphae:

An aerial mycelium is produced well in many media, and many primary and secondary whorls having a straight or flexuous forms are observed.

3. Structure of spores:

By an electron microscopical observation, spores are smooth surfaced, long elliptical or cylindrical, 0.7 to 1.5 $\mu$ 0.5 to 0.6 $\mu$.

4. Colors of mycelium:

Color of aerial mycelium in many mediua is white at beginning, changes gradually to pink or beige color. Sometimes covered with water droplets. Color of substrate mycelium is generally yellowish brown or pale brown.

5. Soluble pigment:

No soluble pigment formation is observed in the medium tested except light putty or ecru color in urea-glycerin medium.

6. Physiological characteristics:
   a. Liquefaction of gelatin: Very poor growth, positive liquefaction.
   b. Starch hydrolysis: Positive hydrolysis.
   c. Nitrate reduction: None.
   d. Peptonization of milk: Hardly observed.
   e. Cellulose decomposition: None.
   f. Production of $H_2S$: None.
   g. Haemolysis: Negative.
   h. Melanin pigment formation: None.

7. Utilization of carbon sources:

Glucose, maltose, starch, dextrin, glycerin, mannose and inositol: Utilized (+).

Xylose, fructose, rhamnose, raffinose, salicin, and arabinose: Not utilized (−).

Lactose, sucrose and mannitol: Not clear (±).

8. Colony:

Giant colony shows a chrysanthemum-like shape, and covered with cottony mycelia.

In comparison with the taxonomical properties between the said Streptomyces hereinabove described and the *Streptomyces griseoverticillatus var. tuberacticus* NRRL3482, they are differentiated as illustrated in Table II. Therefore, this *Streptomyces is herein refered to as Streptomyces griseoverticillatus var. tuberacticus No. N 6-130*.

TABLE II

| Medium | *Streptomyces griseoverticillatus var tuberacticus* NRRL 3482. | This *Streptomyces* |
|---|---|---|
| Urea glycerin agar | Good growth | Very good growth |
| Carrot plug | Moderate | No growth |
| Milk | No coagulation | Weak Coagulation |

This Streptomyces has been deposited at Institute for Microbiological Industry and Technology, Agency of Industrial Science & Technology, Ministry of International Trade & Industry, Japan and added to its permanent culture collection, as a deposit number FERM P-619, further, this strain was also deposited at United States Department of Agriculture, Agricultural Research Service, Northern Utilization Research and Development Division, and added to its deposit number as NRRL 3986.

Above-described *Streptomyces griseoverticillatus var. tuberacticus* No. N 6-130 is only illustrative as the microorganisms usable in this invention, and the present invention also contemplates the use of other tuberactinomycin-N producing strains belonging to genus Streptomyces.

According to this invention, tuberactinomycin-N is produced by inoculating a suitable nutrient medium with tuberactinomycin-N producing Streptomyces, for example *Streptomyces griseoverticillatus var. tuberacticus* No. N 6-130, incubating the mixture under the conditions usable in common antibiotic production, then isolating the antibiotic from the culture medium. The cultivation of the microorganism can be carried out in a number of different ways such as liquid culture or solid culture. The most profitable way for industrial production of tuberactinomycin-N is submerged aeration culture process.

Nutrient media which are useful for the production of tuberactinomycin-N may include an assimilable source of carbon such as glucose, sucrose, lactose, maltose, starch, dextrin, molasses, glycerin, etc.; an assimilable source of organic and inorganic nitrogen such as corn steep liquor, soybean powder, cotton seed oil, gluten, peptone, meat extract, yeast extract, yeast, casein hydrolysate, etc. and such as ammonium salts, inorganic nitrate and the like. The media further include salts such as phosphate, magnesium, calcium, potassium sodium, zinc, manganese, or the like.

For carrying out the culture of the organisms for the production of tuberactinomycin-N, the culturing temperature may be changed generally at the range of temperature in which the microorganism can grow and tuberactinomycin-N can be produced, preferably at 25° − 35°C.

The culturing period is, though varies according to the condition employed, generally 2 to 10 days. When the culture broth reveals a highest potency in antibiotic production, the cultivation should naturally be terminated.

Tuberactinomycin-N is removed from the cultured broth as set forth hereinafter, however, it is almost impossible to extract with water immiscible organic solvents, because of its easily soluble nature in water. Therefore, in industrial manufacture, isolation and purification procedures of tuberactinomycin-N should be exploited by its basic nature.

According to a preferred procedure, the whole beer is filtered, the tuberactinomycin-N is precipitated as a dye salt from the filtrate with adding sulfonic acid dye, such as methyl orange, eriochrome violet, Alizarin Red S and the like. The thus formed tuberactinomycin-N-dye salt is suspended in organic solvents such as methanol, acetone or the like, adding an inorganic acid salt of triethylamine such as triethylamine-hydrochloride, -sulfate or the like therein, and precipitating the inorganic acid salt of tuberactinomycin-N, such as tuberactinomycin-N-hydrochloride, -sulfate or the like. Or alternatively, dye salt of tuberactinomycin-N is dissolved in aqueous hydrochloric acid, aqueous sulfonic acid or the like, and after the pigment is removed by extraction with water immiscible organic solvents therefrom, the water layer is concentrated, adding an organic solvent such as methanol, acetone or the like therein, thereby precipitating the inorganic acid salt of tuberactinomycin-N.

In still another way, the most industrially profitable procedure, cation exchange resin is available to isolate the tuberactinomycin-N from the cultured broth. According to this procedure, tuberactinomycin-N is held in cation exchange resin, eluted with diluted solution of sulfonic acid, hydrochloric acid, or the like, or with diluted alkaline solution, and the tuberactinomycin-N active fractions are collected, neutralizd, concentrated, added a solvent such as methanol, acetone or the like therein, then salt of tuberactinomycin-N is precipitated therefrom. Alternatively, the cultured filtrate is dialyzed or gel-filtered to remove high molecular weight substances such as proteinous substances, polysaccharides or the like present in the broth, concentrated by adding an acid, organic solvent being then to precipitate the acid salt of tuberactinomycin-N.

The thus prepared crude tuberactinomycin-N salt may preferably be purified by recrystallization by dissolving in water, and admixing therewith a water-miscible organic solvent such as methanol, ethanol, acetone, methylcellosolve, dioxane, tetrahydrofuran or the like. It is also purified by charging a chromatographic column such as cation exchange resin, silica gel, cellulose powder or the like carrier available for tuberactinomycin-N purification, eluting and collecting the active fractions, further concentrating and adding a solvent thus isolating the material as a salt.

In a still further method for purification of tuberactinomycin-N salt, the concentrated aqueous solution of tuberactinomycin-N salt is mixed with excess amounts of aqueous triethylamine sulfate to form tuberactinomycin-N sulfate, then a large amount of water miscible organic solvent such as methanol, acetone or the like is added to separate the tuberactinomycin-N sulfate, which is purified by repeating those operations.

The physical and chemical properties of tuberactinomycin-N obtained in accordance with the above-described procedure are as follows:

1. Elemental analysis:
Tuberactinomycin-N hydrochloride:
Found; C: 37.70%, H: 6.12%, N: 22.50%, Cl: 13.32%
Theoretical as based upon $C_{25}H_{43}N_{13}O_{10} \cdot 3$ HCl; C: 37.76%, H: 5.83%, N: 22.90%, Cl: 13.38%

2. Molecular weight: 778.4 (by titration method)

3. Molecular formula by calculation of found elemental analysis and molecular weight: $C_{25}H_{43}N_{13}O_{10} \cdot 3$ HCl as hydrochloride.

4. Melting point: 245°C. (decomposed)

5. Optical rotation as tuberactinomycin-N hydrochloride: $[\alpha]_D^{21} = -19.1$ (c=1, $H_2O$)

6. Ultraviolet absorption spectrum as a hydrochloride: shown in FIG. 1. (concentration; 20 γ/ml.) $\gamma_{max}$: 268 mµ, $E_{1\ cm}^{1\%} = 342.5$ (in water) $\gamma_{max}$: 269 mµ, $E_{1\ cm}^{1\%} = 320.0$ (in 0.1 N-HCl) $\gamma_{max}$: 288 mµ, $E_{1\ cm}^{1\%} = 215.0$ (in 0.1 N-NaOH)

Figure 2:
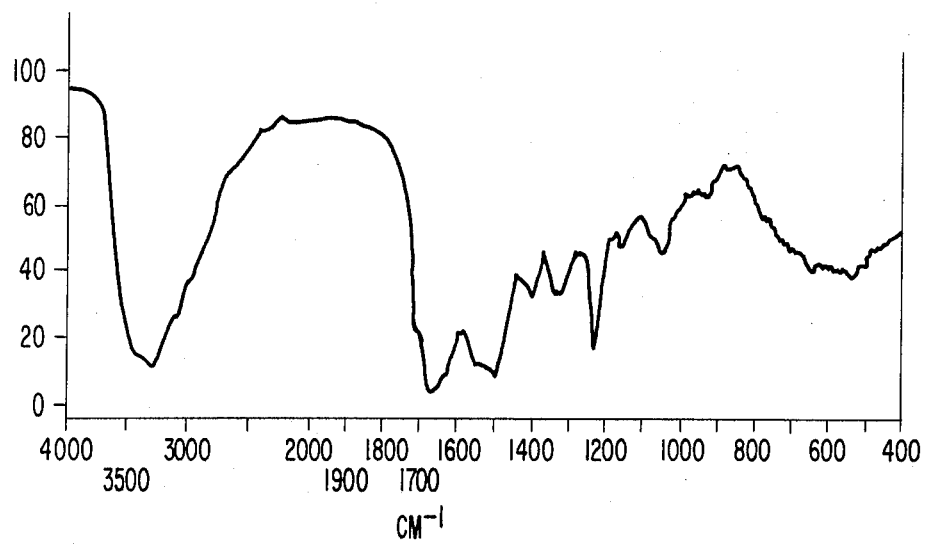
FIG. 2 is a chart showing the infrared absorption spectrum of tuberactinomycin-N.

7. Infrared absorption spectrum (KBr tablet): shown in FIG. 2.
Characteristic peaks: 3300, 1660, 1500, 1225, and 1050 $CM.^{-1}$ 8. Solubility: Inorganic salt of tuberactinomycin-N such as tuberactinomycin-N hydrochloride or -sulfate is easily soluble in water, and is hardly soluble in usual organic solvents.

9. Color reaction: Positibe: ninhydrin, biuret. Negative: Sakaguchi, isatin, Pauli, Molisch.

10. Isolation coefficient: $pka_1 = 7.25$, $pka_2 = 10.05$, $pka_3 > 11$

11. Appearance: White crystalline powder as hydrochloride or sulfate.

Figure 4:
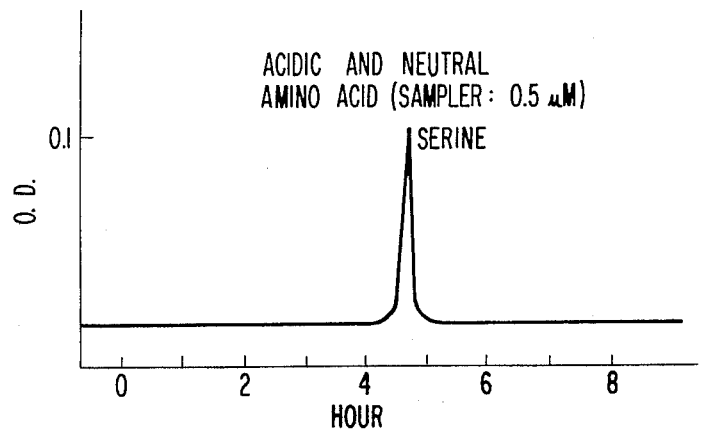
FIG. 4 is a chart showing the amino acid analytical pattern of tuberactinomycin-N hydrochloride.
Figure 5:
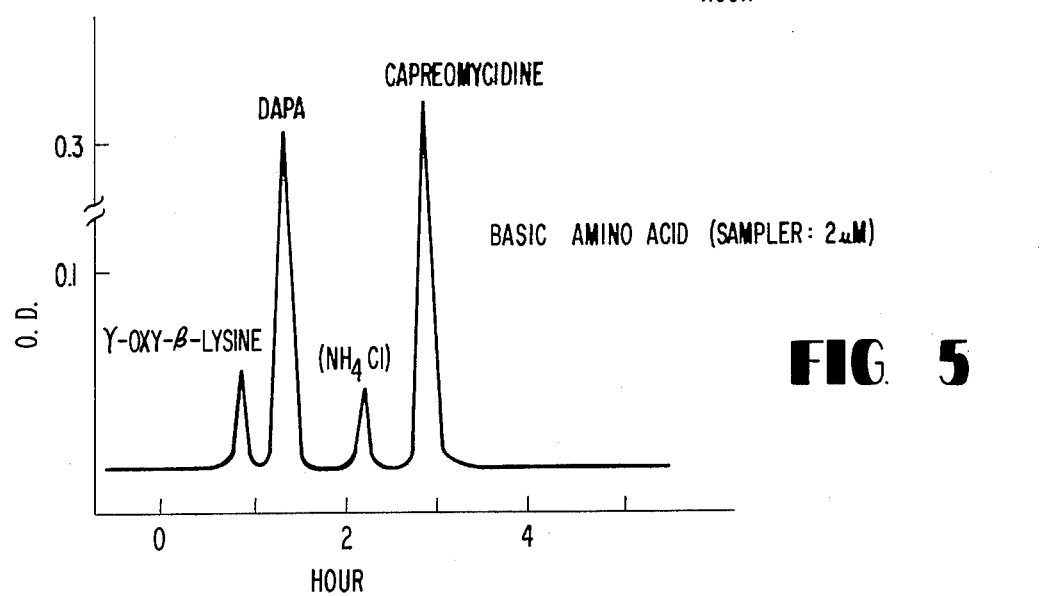

12. Amino acid components: shown in FIG. 4. Acid hydrolysis of tuberactinomycin-N produce serine, DAPA (α,β-diaminopropionic acid), γ-oxy-β-lysine and capreomycidine.

Figure 3:
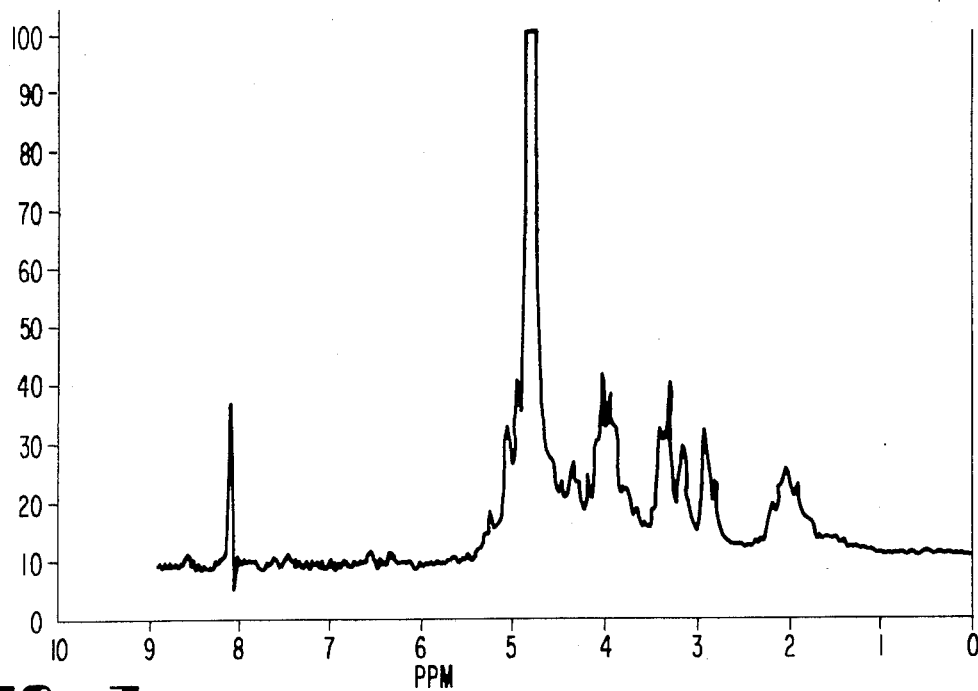
FIG. 3 is a drawing showing the Nuclear Magnetic Resonance spectrum of tuberactinomycin-N hydrochloride.

13. Nuclear Magnetic Resonance spectrum spectrum: shown in FIG. 3. The above-described tuberactinomycin-N has the following chemical structure.

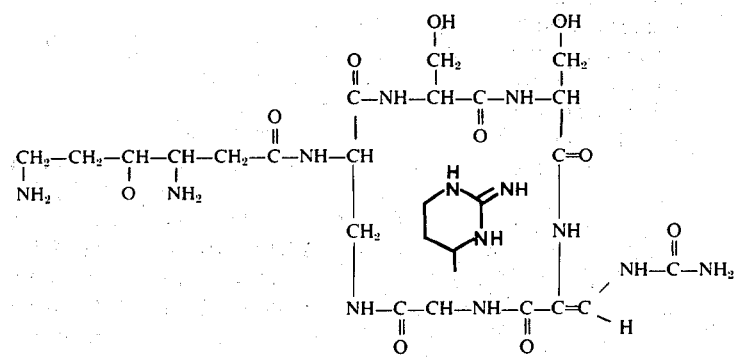

Tuberactinomycin-N is, as described and illustrated hereinbefore, a peptide antibiotic having antituberculosis activity, being composed of 2 moles of serine, 1 mole of L-α,β-diaminopropionic acid, 1 mole of 3-ureidodehydroalanine, 1 mole of L-capreomycidine and 1 mole of erythro-γ-hydroxy-L-β-lysine, being shown maximum ultraviolet absorption peak of on 268 mμ, being positive in ninhydrin and biuret reaction and being negative in Sakaguchi reaction.

Among the antibiotics hitherto reported, tuberactinomycin (tuberactin), viomycin, viomycin-like substance [Arai, et al. Antibiot. & Chemoth., 7 (8), 435 (1957)], phthiomycin [refer to Maeda, K., et al., J. Antibiotics. Ser. A 6(4), 183 (1953), Japan. Pat. Publ., 3096/1955], capreomycin [refer to W. M. Stark, et al., Antimicrob. Agents and Chemoth, 201 (1962)], vinactin [refer to U.S. Pat. 2,633,445] and alboverticillin [Maeda, K., et al., J. Antibioitcs, 11A, 30 (1958)] may resemble tuberactinomycin-N as to some of its characteristics. Tuberactinomycin-N is however different from those antibiotics as follows:

1. Comparison with tuberactinomycin: Tuberactinomycin shows positive Sakaguchi reaction, whereas tuberactinomycin-N shows negative Sakaguchi reaction. Tuberactinomycin-N contains capreomycidine as its structural amino acid and not contains tuberactidine (basic guanidine compound), whereas tuberactinomycin does not contain capreomycidine and contains tuberactidine. Therefore, tuberactinomycin is completely different from tuberactinomycin-N.
2. Comparison with viomycin: Viomycin shows positive Sakaguchi reaction, whereas tuberactinomycin-N shows negative Sakaguchi reaction, which shows the differences between the two antibiotics.
3. Comparison with alboverticillin: Alboverticillin has no ultraviolet absorption spectrum peak at 220-320 mμ, whereas tuberactinomycin-N shows a peak at 268 mμ.
4. Comparison with capreomycin: Capreomycin contains alanine and β-lysine as structural amino acid, whereas tuberactinomycin-N does not contain these amino acid and contains serine and γ-oxy-β-lysine.
5. Comparison with viomycin-like substance: Ratio of $E_1{}_{cm}^{1\%}$ of maximum absorption peaks in acid and alkaline solution of viomycin-like substance is 1.20, whereas the corresponding ratio of tuberactinomycin-N hydrochloride is 1.49, and the ultraviolet absorption peak in 0.1 N-NaOH of viomycin-like substance is at 280 mμ, whereas those of tuberactinomycin-N is at 288 mμ, showing the differences of both antibiotics.
6. Comparison with phthiomycin: Ratio of $E_1{}_{cm}^{1\%}$ of maximum absorption peaks in acid and alkaline solution of phthiomycin is 1.09, whereas the corresponding ratio of tuberactinomycin-N hydrochloride is 1.49, showing the differences of both antibiotics.
7. Comparison with vinactin: Vinactin is the same antibiotic as viomycin (H. Umezawa, Index of Antibiotics from Actinomycetes, p. 684, 1970, University of Tokyo Press), therefore is different from tuberactinomycin-N.

As illustrated hereinbefore, tuberactinomycin-N is a new and novel antibiotic different from the antibiotics hitherto known in the prior arts. Biological properties of tuberactinomycin-N are as follows:

1. Acute toxicity of tuberactinomycin-N sulfate: $LD_{50}$ = 385 mg./kg. (ddy strain mouse, i.v.) $LD_{50}$ = 1240 mg./kg. (ddy strain mouse, i.m.)
2. Antimicrobial spectrum in agar streak dilution method:

| Organism | Minimum inhibitory concentration (mcg./ml.) |
|---|---|
| Pseudomonas aeruginosa | > 100 |
| Escherichia coli NIHJ | 50 |
| Escherichia coli B | 100 |
| Proteus vulgaris OX 19 | > 100 |
| Salmonella paratyphi A | 25 |
| Salmonella paratyphi B | 100 |
| Shigella dysenteriae E-1 | 25 |
| Shigella flexineri | 100 |
| Shigella sonnei E-33 | > 100 |
| Bacillus subtilis PCI 219 | 12.5 |
| Staphylococcus aureus FDA 209 P | > 100 |
| Staphylococcus albus | > 100 |
| Staphylococcus citreus | > 25 |
| Micrococcus flavus | > 100 |
| Sarcina lutea | 100 |
| Sarcina lutea ATCC 1001 | 100 |
| Mycobacterium ATCC 607 | 12.5 |
| Vibrio comma (A) | > 100 |
| Vibrio comma (B) | > 100 |
| Staphylococcus aureus Yoshioka | > 100 |
| Staphylococcus aureus Yonemoto | 25 |

3. Antituberculosis activity:
   i. Strain used: Mycobacterium tuberculosis $H_{37}Rv$
   ii. Medium: Kirchner's semi liquid medium, pH 6.9
   iii. Inoculum size: $10^{-3}$ mg.
   iv. Observation: after 3 weeks incubation.
      a. Minimum inhibitory concentration on sensitive strains: 4 mcg./ml.
      b. Minimum inhibitory concentration on resistant strains: shown in the Table

| | Minimum inhibitory concentration (mcg./ml.) | |
|---|---|---|
| | Corresponding drug | tuberactinomycin-N |
| Streptomycin resist. strain | 64 | 2 |
| p-aminosalicilic acid resist. strain | 256 | 4 |
| iso-nicotinic acid hydrazid resistant strain | 256 | 4 |
| Viomycin resistant strain | 64 | 32 |
| Kanamycin resistant strain | 8 | 4 |
| Cycloserine resist. strain | 256 | 2 |

4. Experimental chemotherapeutic effect in mice:

Three groups of ten ddY strain mice, male, weighed 20 g., infected intravenously with pathogenic tuberculous bacilli, Mycobacterium tuberculosis $H_{37}Rv$, were treated with tuberactinomycin-N hydrochloride, 0.5 mg./mouse/day, 1mg./mouse/day and 2 mg./mouse/day, for each group respectively, administered subcutaneously after three days infection. Treatment was continuously received for three weeks. One group of ten mice was administered physiological saline as a control group. Result is shown in the following table.

Servival days after strain $H_{37}Rv$ infection:

| mouse No. | Control group I | Control group II | Treated mouse (dose: mg./mouse/day) 0.5 | 1.0 | 2.0 |
| --- | --- | --- | --- | --- | --- |
| 1 | 20 | 20 | 21 | 24 | >42 |
| 2 | 21 | 21 | 22 | 25 | 42 |
| 3 | 21 | 21 | 25 | >42 | 42 |
| 4 | 21 | 22 | 29 | 42 | 42 |
| 5 | 22 | 23 | 35 | 42 | 42 |
| 6 | 22 | 28 | >42 | 42 | 42 |
| 7 | 23 | 29 | 42 | 42 | 42 |
| 8 | 25 | 30 | 42 | 42 | 42 |
| 9 | 26 | >42 | 42 | 42 | 42 |
| 10 | 29 | 42 | 42 | 42 | 42 |

Following examples are only for illustration of the process and products of the present invention but are not to be construed as limiting. All percentages are by weight and all solvent mixture propertions are by volume unless otherwise noted.

EXAMPLE 1.

Two liters of an aqueous medium consisting of glucose 3 percent, starch 2 percent, soybean meal 3% and sodium chloride 1.5 percent were equally divided and introduced into twenty 500-milliliter Erlenmeyer flasks, adjusted to pH 6, sterilized at 120°C. for 30 minutes, inoculated with Streptomyces griseoverticillatus var. tuberacticus N 6-130 and then rotatively shake-cultured (radius 2.5 cm., 330 r.p.m.) at 30°C. for 7 days, obtaining 1.5 l. of cultured broth containing 2,360 mcg./ml/ of tuberactinomycin-N.

Filtered broth was passed at 2.5 ml./min. through a resin column (2.5 cm. diameter, 28 cm. length) packed with 150 ml. of ion exchange resin Amberlite IRC-50 sodium type (Rohm and Haas Co., U.S.A.). The column was washed with water, eluted with 0.5 N-HCl at a flow rate 1.3 ml./min. The eluates were fractionated each 10 ml., and tuberactinomycin-N activity was found at fractions Nos. 45 – 63 observed by ultraviolet absorption method and bioassay.

The thus yielded active fraction, about 200 ml., was neutralized with sodium hydroxide, concentrated to about 15 ml. in vacuo, separating the precipitated inorganic salts therefrom. After decolorization with active carbon, 150 ml. of methanol was added, the mixture was allowed to stand overnight at 5°C. and the precipitate was collected by filtration. The precipitate was washed with methanol and dried in vacuo to yield crude tuberactinomycin-N hydrochloride, (yield; 3.07 g., purity 71.5%, recovery; 62%).

EXAMPLE 2.

In Example 1, the aqueous medium was replaced by the medium consisting of glucose 3 percent, starch 2 percent, molasses 1.5 percent, soy bean meal 1.5 percent and sodium chloride 1.5 percent, adjusted to pH 6.0, to obtain cultured broth 1.5 L. containing 2150 mcg./ml. of tuberactinomycin-N. Tuberactinomycin-N hydrochloride was yielded as a crude sample, (yield; 2.98 g., purity; 70.5 percent, recovery; 65%).

EXAMPLE 3.

In Example 1, the medium was replaced by the following: glucose 2 percent, starch 3 percent, dry yeast 1.4 percent, and sodium chloride 0.5 percent, to obtain 1 – l. of the cultured broth consisting of 1665 mcg./ml. of tuberactinomycin-N and to yield 1.55 g. of crude tuberactinomycin-N hydrochloride, (purity 72 percent, recovery 67 percent).

EXAMPLE 4.

100 ml. of aqueous medium consisting of starch 1 percent, molasses 1 percent, peptone 1 percent, meat extract 1 percent and sodium chloride 0.5 percent were introduced into a 500 ml. Sakaguchi flask, adjusted to pH 7.0, sterilized at 120°C. for 30 minutes, inoculated with Streptomyces griseoverticillatus var. tuberacticus No. N 6-130 and then cultured with reciprocatory shaking, 7 cm: stroke, 130 reciprocations per minute, at 30°C. for 2 days. The fermented broth was inoculated into 20 l. of sterilized (at 120°C., 30 minutes), aqueous medium, consisting of starch 1 percent, molasses 1 percent, peptone 1 percent, meat extract 1 percent, sodium chloride 0.5 percent and antifoaming agent 5 ml. (Uniol D-2000, Trade name of Nissan Oil Co., Ltd., Tokyo), in 30 l. jar fermenter, and cultured at 30°C. for 24 hours, with aeration 20 l./min., agitation 200 r.p.m. After the 24 hours fermentation, the broth was introduced into 200 l. of sterilized aqueous medium comprising starch 3 percent, glucose 2 percent, defatted soy bean meal 4.0 percent, sodium chloride 1.5% and antifoaming agent 100 ml. (pH 6.0, before sterilization), in 250 l. stainless steel fermentation tank, and cultured at 30°C. for 90 hours with aeration 100 l./min., agitation 300 r.p.m. to obtain cultured broth 190 l. consisting of 2400 mcg./ml. of tuberactinomycin-N.

The cultured broth was adjusted to pH 2.0 with hydrochloric acid and there was added thereto 25 percent by volume of diatomaceous earth, and the mixture was filtered at reduced pressure to obtain 160 l. of filtered broth. After neutralization, the filtrate was passed through the resin tower, consisting of 10 l. of ion exchange resin IRC-50 (Na-type), at flow rate 20 l./hour to absorb the tuberactinomycin-N contained therein. The resin was washed with water, then eluted with 1 N-hydrochloric acid at the flow rate 5 l./hour, fractionated each 1.5 l., and there was found the tuberactinomycin-N within the fractions Nos. 10 – 17. The active fraction was concentrated to about 1300 ml. in vacuo after neutralization with sodium hydroxide under removing the precipitated sodium chloride. The thus obtained concentrate was decolored with active charcoal and 10.4 l. of methanol was added with stirring therein; the mixture was permitted to stand overnight at 5°C., to precipitate the tuberactinomycin-N. Tuberactinomycin-N was washed with methanol, dried over phosphorus pentoxide in vacuo, to yield the crude tuberactinomycin-N hydrochloride, (yield; 395 g., purity; 71.0%, recovery; 72.8%).

EXAMPLE 5.

Fermentation was conducted by the same process as in Example 2 to obtain 20 l. of cultured broth with 2200 mcg./ml. of tuberactinomycin-N contained therein.

The broth was adjusted to pH 2.0 with sulfuric acid, then filtered after adding a small amount of filter-aid to provide 1.76 l. of clear filtrate, which was adjusted at pH 5.5, 16.5 g. of eriochrome violet being added, dialysed for 1.5 hours, filtering the precipitate thereafter. The precipitated dye salt of tuberactinomycin-N was dried in vacuo after washing with water. The thus prepared dye salt of tuberactinomycin-N was suspended in 350 ml. of mixture of 80 percent acetone and 20 percent of methanol, then 50 percent methanol solution of triethylamine sulfate was added until no more precipitate of tuberactinomycin-N sulfate was formed. After stirring the mixture for 1.5 hours, the precipitate was collected by filtration, washed with acetone and methanol to remove dye, dissolved in a small amount of water and the tuberactinomycin-N sulfate precipitated by the addition of methanol, (yield; 3.09 g., purity 79%, recovery 63%)

EXAMPLE 6.

7.5 g. of tuberactinomycin-N hydrochloride obtained in Example 1 was dissolved in 75 ml. of distilled water. The solution was passed through a column, comprising 50 ml. of ion exchange resin Amberlite IRA-411 (sulfonic acid type), at a flow rate of 20 ml./hour, and fractionated each 10 ml. to obtain tuberactinomycin-N activity at the fraction No. 3 – 12. This fraction was combined and concentrated in vacuo, until the concentration of tuberactinomycin-N was 200 mg./ml. To this concentrate 4 volumes of methanol was added therein and the precipitated material was filtered to obtain tuberactinomycin-N hydrochloride, (yield; 6.17 g., purity; 80.2 percent, recovery; 92 percent).

EXAMPLE 7.

100 mg. of tuberactinomycin-N hydrochloride obtained in Example 1 were dissolved in 5 ml. of solution comprising n-butanol : pyridine : acetic acid : water (15 : 10 : 3 : 12, v/v) and the solution was absorbed on a cellulose powder column (1 cm × 130 cm.) in the same solvents mixture. Then, the same solvent mixture was passed through the column at a flow rate of 10 ml./hour. The eluate was collected in each 3 ml. fraction. Tuberactinomycin-N was found within the fractions Nos. 39 – 46. The active fraction was concentrated to 1 ml. in vacuo and 5 ml. of methanol added to yield 60 mg. of tuberactinomycin-N hydrochloride.

We claim:

1. An antibiotic substance selected from the group consisting of tuberactinomycin-N having the formula

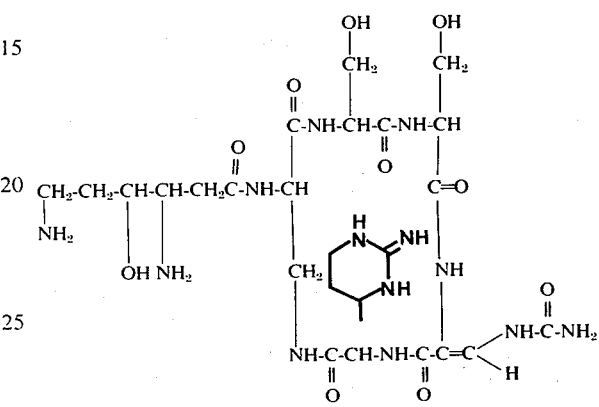

and therapeutically acceptable salts thereof.

* * * * *